N. S. GREENWOOD.
Grain Screen.

No. 105,066.

Patented July 5, 1870.

Witnesses:
Thomas Swathwout
J W Munday

Inventor:
Nathan S. Greenwood
J. L. L. Coburn
atty

# United States Patent Office.

NATHAN S. GREENWOOD, OF DORSET, ILLINOIS.

Letters Patent No. 105,066, dated July 5, 1870.

IMPROVEMENT IN GRAIN AND SEED-SIEVES.

The Schedule referred to in these Letters Patent and making part of the same.

I, NATHAN S. GREENWOOD, of Dorset, in the county of De Kalb and State of Illinois, have invented certain Improvements in Grain and Seed-Sieves, of which the following is a specification.

My invention relates to grain and seed-sieves employed in Thrashers, Separators, &c.; and consists in providing a series of sieves arranged en echelon, one below another, with projecting fingers, which catch the straw and stalks, and carry them over the sieves, as is more fully hereinafter set forth. The seed or grain passes through between the said fingers to the sieves.

Description of Accompanying Drawing.

Figure 1:
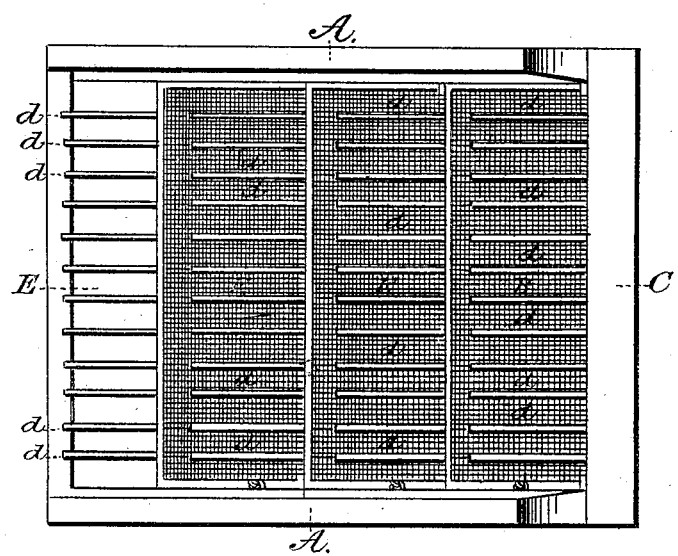
Figure 2:
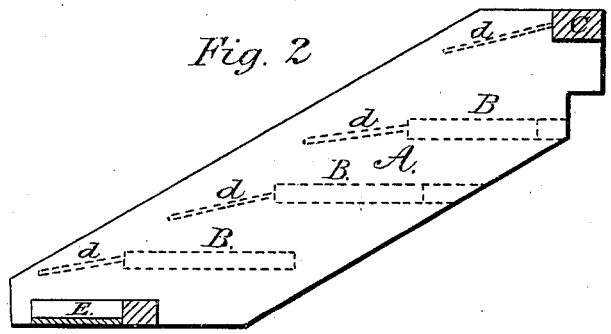

Figure 1 is a top or plan view of my invention.
Figure 2 is a side elevation of same, showing in dotted lines the sieves and fingers attached thereto.

General Description.

A is an ordinary seed-frame, carrying the sieves B, and swung to vibrate before a fan in the usual manner.

C is a stringer or piece across the top of said frame.

Attached to said piece C are the fingers $d$, which project over the top sieve B of the series of sieves.

In like manner similar fingers $d$ are attached to the frame of each sieve, to project over the sieve next below.

The fingers of the lowest or bottom sieve project over the trough E at the lower end of the frame A, said trough being intended to carry off the seed, grain, or other matter which passes over the sieves.

It will be readily seen that the straw or stalks will be carried upon the fingers $d$, passing from one set down to another.

If one sieve is loaded to more than its capacity, the grain and chaff pass over upon the next sieve, and so on down the entire series, the sieves being arranged one forward and below another.

The chaff and grain or seed fall through the fingers upon the sieves. A current of air blown through the machine by any ordinary contrivance, catches the chaff and dirt as they fall from the fingers $d$, and it is blown over.

By arranging the sieves as above described, the air strikes directly and uninterruptedly between the sieves to the grain and chaff as they fall through the fingers $d$, and the grain is cleared of the straw and chaff to a very great extent before it strikes the sieve at all.

The capacity of the sieves is greatly increased by this arrangement of them, and also, by the fingers which carry the straw and coarse material entirely over the sieves, being kept clear therefrom; a draught and passage for the air from the fan or blower is thus allowed, which is a great advantage.

Claim.

I claim as my invention—

The series of sieves B and fingers $d$, when arranged and operating as and for the purposes specified and shown.

NATHAN S. GREENWOOD.

Witnesses:
L. L. COBURN,
J. W. MUNDAY.